United States Patent
Kupratis

(10) Patent No.: US 9,157,366 B2
(45) Date of Patent: Oct. 13, 2015

(54) ADAPTIVE FAN WITH COLD TURBINE

(75) Inventor: Daniel Bernard Kupratis, Wallingford, CT (US)

(73) Assignee: United Technologies Corporation, Hartford, CT (US)

(*) Notice: Subject to any disclaimer, the term of this patent is extended or adjusted under 35 U.S.C. 154(b) by 696 days.

(21) Appl. No.: 13/483,449

(22) Filed: May 30, 2012

(65) Prior Publication Data

US 2013/0318981 A1  Dec. 5, 2013

(51) Int. Cl.
| F02C 3/06 | (2006.01) |
| F02K 3/075 | (2006.01) |
| F02C 9/16 | (2006.01) |
| F02K 3/06 | (2006.01) |
| F02C 3/10 | (2006.01) |

(52) U.S. Cl.
CPC ... *F02C 3/06* (2013.01); *F02C 3/10* (2013.01); *F02C 9/16* (2013.01); *F02K 3/06* (2013.01); *F02K 3/075* (2013.01)

(58) Field of Classification Search
CPC ......... F02K 3/077; F02K 3/075; F02K 3/072; F02K 3/02; F02K 3/04; F02K 3/06; F01D 17/105; F01D 17/14; F01D 17/162
USPC ........... 60/773, 226.1, 268, 792, 39.162, 262; 415/68, 69, 1, 144–145, 159, 162; 416/129, 198 A
See application file for complete search history.

(56) References Cited

U.S. PATENT DOCUMENTS

| 3,486,328 | A | * | 12/1969 | Boudigues | 60/39.181 |
| 4,010,608 | A | * | 3/1977 | Simmons | 60/226.3 |
| 4,064,692 | A | | 12/1977 | Johnson et al. | |
| 4,069,661 | A | * | 1/1978 | Rundell et al. | 60/204 |
| 4,376,375 | A | | 3/1983 | Boudigues | |
| 5,794,432 | A | | 8/1998 | Dunbar et al. | |
| 5,809,772 | A | * | 9/1998 | Giffin et al. | 60/226.1 |
| 5,816,042 | A | | 10/1998 | Guinan et al. | |
| 6,102,329 | A | | 8/2000 | Guinan et al. | |
| 6,209,311 | B1 | * | 4/2001 | Itoh et al. | 60/226.3 |
| 7,246,484 | B2 | * | 7/2007 | Giffin et al. | 60/268 |
| 7,926,290 | B2 | | 4/2011 | Johnson et al. | |
| 8,104,265 | B2 | | 1/2012 | Kupratis | |
| 8,127,528 | B2 | | 3/2012 | Roberge | |

(Continued)

OTHER PUBLICATIONS

International Preliminary Report on Patentability for International Application No. PCT/US2013/040047 mailed Dec. 11, 2014.

(Continued)

*Primary Examiner* — Steven Sutherland
(74) *Attorney, Agent, or Firm* — Carlson, Gaskey & Olds, P.C.

(57) ABSTRACT

A disclosed gas turbine engine includes a first fan section including a plurality of fan blades rotatable about an axis, a compressor in fluid communication with the first fan section, a combustor in fluid communication with the compressor and a first turbine section in fluid communication with the combustor. The first turbine section includes a low pressure turbine that drives the first fan section. A second fan section is supported between the first fan section and the compressor and is driven by a second turbine section disposed between the second fan section and the compressor for driving the second fan section.

20 Claims, 3 Drawing Sheets

(56) References Cited

U.S. PATENT DOCUMENTS

| | | |
|---|---|---|
| 2004/0060279 A1 | 4/2004 | Robert Joseph et al. |
| 2005/0024129 A1 | 2/2005 | Jang |
| 2007/0119150 A1 | 5/2007 | Wood et al. |
| 2010/0223902 A1 | 9/2010 | Mailander et al. |
| 2011/0150633 A1 | 6/2011 | Baughman |
| 2011/0167792 A1 | 7/2011 | Johnson et al. |

OTHER PUBLICATIONS

International Search Report and Written Opinion for International Application No. PCT/US2013/040047 completed on Jul. 25, 2013.

* cited by examiner

ADAPTIVE FAN WITH COLD TURBINE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The energetic gas flow expands through the turbine section to drive the compressor and the fan section and finally exits through a thrusting nozzle.

Temperature and overall pressure ratio are factors that can limit operation and performance of a gas turbine engine. Higher pressure ratios result in higher operating temperatures in key locations of the gas turbine engine. In a mixed flow turbofan gas turbine engine the overall pressure ratio is limited by the unique match of static pressures between a bypass stream and the core engine stream exiting a low pressure turbine. Moreover, increased pressures increase temperatures beyond desirable limits and therefore also limit overall engine operation.

Accordingly, it is desirable to develop and design an engine architecture for a mixed turbofan gas turbine engine that provides for operation at higher pressure ratios while remaining within temperature and other operational limitations.

SUMMARY

A gas turbine engine according to an exemplary embodiment of this disclosure, among other possible things includes a first fan section including a plurality of fan blades rotatable about an axis, a compressor in fluid communication with the first fan section, a combustor in fluid communication with the compressor, a first turbine section in fluid communication with the combustor, the first turbine section driving the fan section, a second fan section disposed between the first fan section and the compressor, and a second turbine section disposed between the second fan section and the compressor, the second turbine section driving the second fan section.

A further embodiment of the foregoing gas turbine engine including a variable vane disposed between the second fan section and the second turbine section for controlling airflow through the second turbine section.

A further embodiment of any of the foregoing gas turbine engine, wherein the variable vane is movable between a first position for driving the second turbine at a first speed and a second position for driving the second turbine at a second speed slower than the first speed.

A further embodiment of any of the foregoing gas turbine engine, including a fixed vane disposed between the second fan section and the variable vane.

A further embodiment of any of the foregoing gas turbine engine, including a core flow path including the second turbine and leading into the compressor, a first bypass stream defined radially outward of the core flow path and a second bypass stream defined radially outward of the core and first bypass streams.

A further embodiment of any of the foregoing gas turbine engine, wherein the second fan section directs airflow into the first bypass stream and the core flow path.

A further embodiment of any of the foregoing gas turbine engine, wherein the second turbine and the second fan section are attached.

A further embodiment of any of the foregoing gas turbine engine, including an augmenter aft of the first turbine section.

A gas turbine engine according to an exemplary embodiment of this disclosure, among other possible things includes a first fan section including a plurality of fan blades rotatable about an axis, a core engine including a compressor in fluid communication with the first fan section, a combustor in fluid communication with the compressor and a first turbine section in fluid communication with the combustor, the turbine section driving the fan section, a core flow passage providing air to the core engine, an annular bypass passage disposed about the core engine, a second fan section disposed between the first fan section and the compressor, the second fan section driving flow into the annular bypass passage, and a second turbine section disposed between the second fan section and the compressor in the core flow passage, the second turbine section driving the second fan section.

A further embodiment of the foregoing gas turbine engine including a variable vane disposed between the second fan section and the second turbine section for controlling airflow through the second turbine section.

A further embodiment of any of the foregoing gas turbine engines, wherein the variable vane is movable between a first position for driving the second turbine at a first speed and a second position for driving the second turbine at a second speed slower than the first speed.

A further embodiment of any of the foregoing gas turbine engines, wherein the annular bypass passage comprises an inner annular bypass passage disposed about the core engine, an outer annular bypass passage radially outward of the inner bypass passage, and a splitter disposed between the inner and outer annular bypass passages.

A further embodiment of any of the foregoing gas turbine engines, including an augmenter aft of the first turbine section.

A further embodiment of any of the foregoing gas turbine engines, including at least one bearing assembly supporting rotation of the second fan section and the second turbine section.

A method of operating a gas turbine engine according to an exemplary embodiment including defining a core gas flow path through a core engine, where the core engine includes a high pressure compressor, a combustor in communication with the compressor and a first turbine driven by gas flow generated by the combustor, adjusting a vane to a first position for driving a second turbine disposed forward of the compressor in the core gas flow path to provide a first condition of core flow to the high pressure compressor, and adjusting the vane to a second position for driving the second turbine to provide a second condition of core flow to the high pressure compressor.

A further embodiment of the foregoing method, wherein the first condition comprises a first temperature of flow through the high pressure compressor and the second condition comprises a second temperature of flow through the high pressure compressor.

A further embodiment of any of the foregoing methods, including driving a fan blade forward of the core gas flow path with the second turbine for controlling flow into the gas flow path A further embodiment of any of the foregoing methods, including providing a maximum level of de-supercharging of flow into the core gas flow path at a first flight condition and providing a minimum level of de-supercharging of flow into the core gas flow path at a second flight condition.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
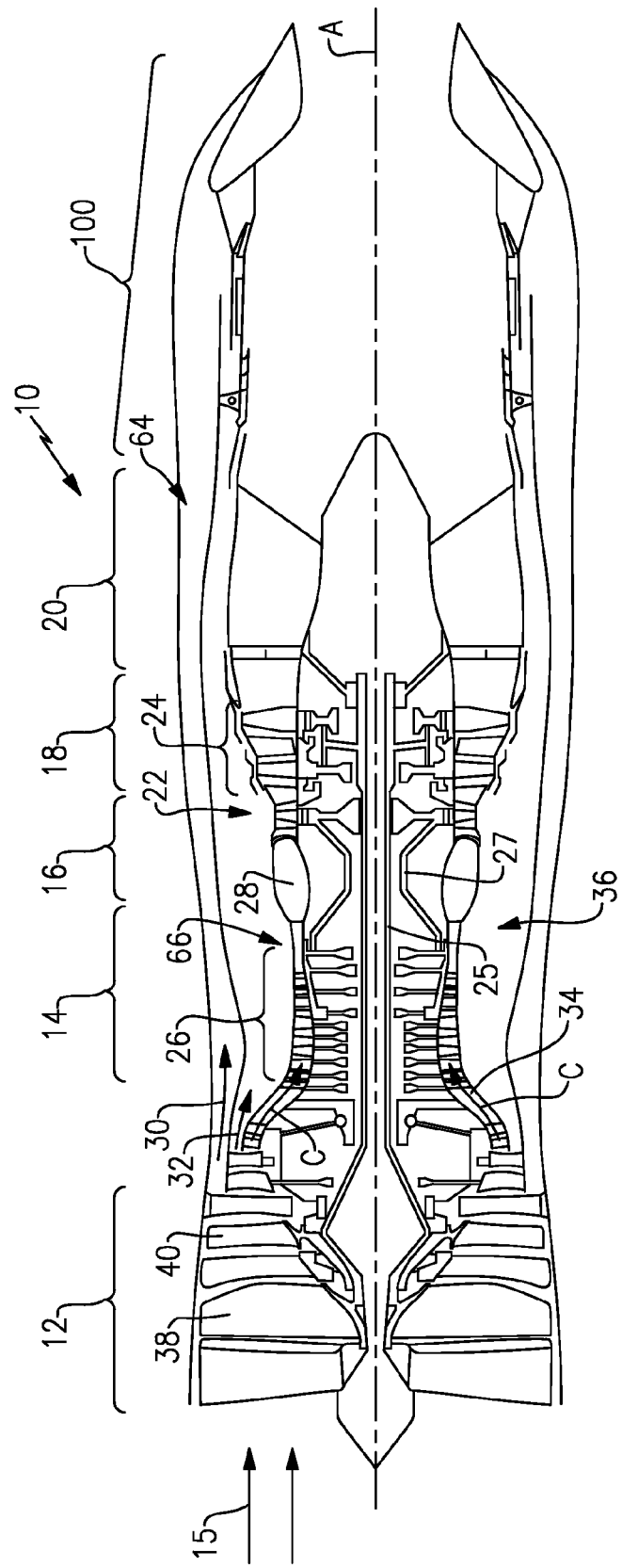
FIG. 1 is a schematic view of an example gas turbine engine.

FIG. 1 schematically illustrates an example gas turbine engine generally indicated at 10. The gas turbine engine includes a fan section 12 that communicates air to a compressor section 14. The compressed air from the compressor section 14 is provided to a combustion section 16 where it is mixed with fuel and ignited to produce a high energy gas flow. The energetic gas flow is expanded through a turbine section 18, through an augmenter section 20, and finally through an exhaust nozzle 100.

The example gas turbine engine 10 is a mixed flow turbofan engine that includes a core flow path 34 for core flow C through the compressor section 14, combustion section 16, and turbine section 18. Disposed annularly about the core flow path C is a first annular bypass passage 32 for a first bypass flow B1 about an engine core 36. The gas turbine engine 10 includes a second bypass passage 30 disposed radially outward of the first bypass passage 32 for a second bypass flow B2.

Figure 2:
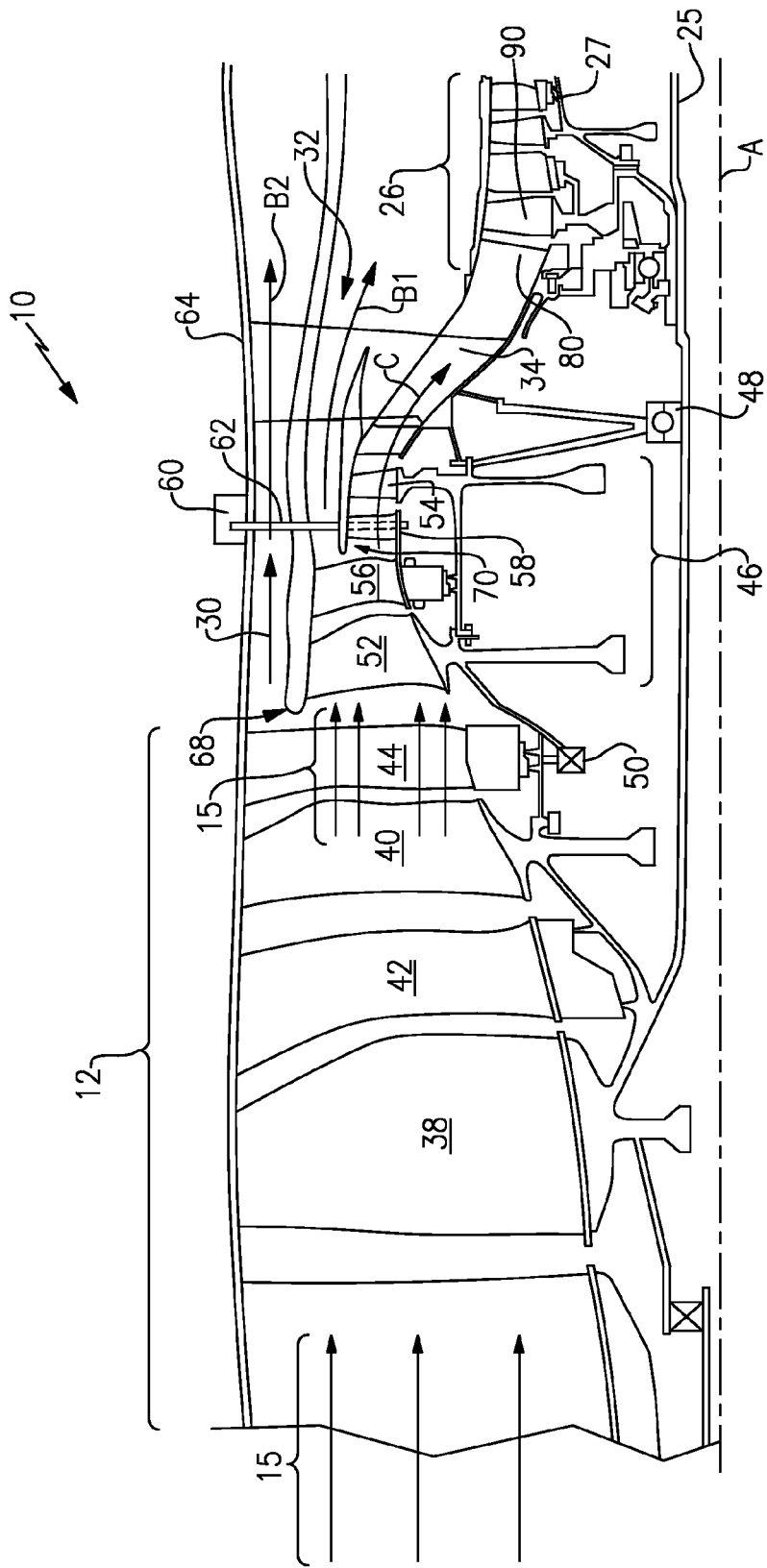
FIG. 2 is an enlarged schematic representation of a portion of the example gas turbine engine.

Referring to FIG. 2 with continued reference to FIG. 1, in operation, incoming air 15 is initially compressed by first and second fan stages 38, 40 within the fan section 12. The first fan section 12 includes a stator 42 for directing air flow 15 between fan stages 38 and 40. This initially compressed air is provided to the core engine 36 and specifically through the core flow passage 34 to high pressure compressor 26. In the high pressure compressor 26, the air is compressed and communicated to the combustor 28. In the combustor 28, the high pressure air is mixed with fuel and ignited to produce a high energy gas flow stream. The high energy gas flow stream is expanded through a high pressure turbine 22 and then through a low pressure turbine 24. The low pressure turbine 24 is attached to drive an inner shaft 25 that extends forward to drive the fan section 12. The high pressure turbine 22 is attached to an outer shaft 27 to drive the high pressure compressor 26.

As appreciated, although a gas turbofan engine including two separate bypass passages 30, 32 is described, other engine configurations that includes other bypass configurations and turbine configurations are also within the contemplation of this disclosure.

The example disclosed gas turbine engine 10 is utilized for flight conditions that include high Mach number flight speeds. At high Mach number flight speeds, the core engine 36 experiences an overall pressure ratio that is limited by the relationship between static pressures of the bypass flows B1 and B2 and the core flow C. The difference in static pressures limits the overall pressure ratio. Furthermore, the overall pressure ratio is limited due to temperature conditions within the high pressure compressor 26. As appreciated, increases in overall pressure ratio may result in an increase in the temperature within the compressor 26. The temperature within the compressor, specifically, the temperature of the last compressor stage generally indicated at 66 can be a limiting factor to the operation of the example gas turbine engine 10. The temperature at the last stage of the compressor 66 is maintained within acceptable parameters for all flight conditions and Mach numbers by the features of the disclosed example gas turbine engine 10.

Referring to FIG. 2, an enlarged section of a front portion of the example gas turbine engine 10 shows a third spool 46 that includes a cold turbine 54 that drives a fan stage 52. A vane strut 44 provides for direction of air to the fan stage 52 and also provides a support from the engine case 64 to a forward bearing assembly 50. Another embodiment holds fixed every other circumferential vane 44 and moves every other circumferential vane 44 as a pattern of fixed, variable, fixed, variable, . . . , fixed, variable. The fixed vanes 44 carry structural loads between engine case 64 and bearing 50. The third spool 46 de-supercharges the core airflow C into the compressor 26. De-supercharging of the core airflow C controls the temperature at the last compressor stage 66 to allow an increased and net higher overall pressure ratio of the example gas turbine engine 10 for different flight conditions and speeds.

The turbine 54 is driven by core airflow C that is disposed aft of a splitter 70 that splits incoming airflow between the core streams C and first bypass stream B1. A first splitter 68 splits the incoming airflow 15 between the outer or second bypass passage 30 and the inner or first bypass passage 32. The second splitter 70 further splits the incoming airflow 15 into the core stream flow C and the first bypass flow B1.

Airflow B1 into the first bypass passage 32 and the core airflow C are directed and compressed by the fan 52 that is in turn driven by the turbine 54. The fan 52 and the turbine 54 comprise a third spool that rotates independent of the high pressure turbine 22 (FIG. 1) and the low pressure turbine 24 (FIG. 1) disposed in the aft portion of the gas turbine engine 10.

The third spool 46 is supported by an aft bearing 48 and forward bearing 50. The example bearings supporting the third spool 46 are schematically indicated at 50 and 48 (FIG. 2). The aft bearing 48 is illustrated as a thrust bearing. The forward bearing 50 is further illustrated as a simple bearing assembly. Forward bearing 50 may be eliminated by configuring aft bearing 48 as a dual bearing cantilevered configuration to maintain rotational rigidity of the third spool 46 and balance thrust. Moreover, the bearing assemblies 48, 50, could be of any known configuration for supporting rotation of the third spool 46 about the engine axis A.

A first vane 56 is disposed forward of the splitter 70 and directs air into the first annular bypass passage 32 and the core passage 34. A variable vane 58 is disposed within the core airflow passage 34 just aft of the splitter 70. The variable vane 58 is movable between a first position 72 (FIG. 3) and a second position 74 (FIG. 3) by a controller 60 that moves a control arm 62. As appreciated, the vane 58 comprises a plurality of vanes annularly disposed within the core flow passage 34. Each of the vanes 58 are movable between the first position 72 and the second position 74 to control a speed at which the turbine 54 rotates about the engine axis A. Another embodiment holds fixed every other circumferential vane 58 and moves every other circumferential vane 58 as a pattern of fixed, variable, fixed, variable, . . . , fixed, variable. The fixed vanes 58 carry structural loads. The alteration and adjustment of the speed of the turbine 54 changes the speed of the fan 52 that changes the condition of the core flow C into the core flow passage 34 to the high pressure compressor 26 and changes the condition of the bypass flow B1 into passage 32. The control of the core flow C provides control of the de-supercharging of air to the compressor 26 for controlling the temperature within the compressor 26. The control of the temperature further provides for operation of the gas turbine engine 10 at a higher net overall pressure ratio at low flight Mach numbers.

Figure 3:
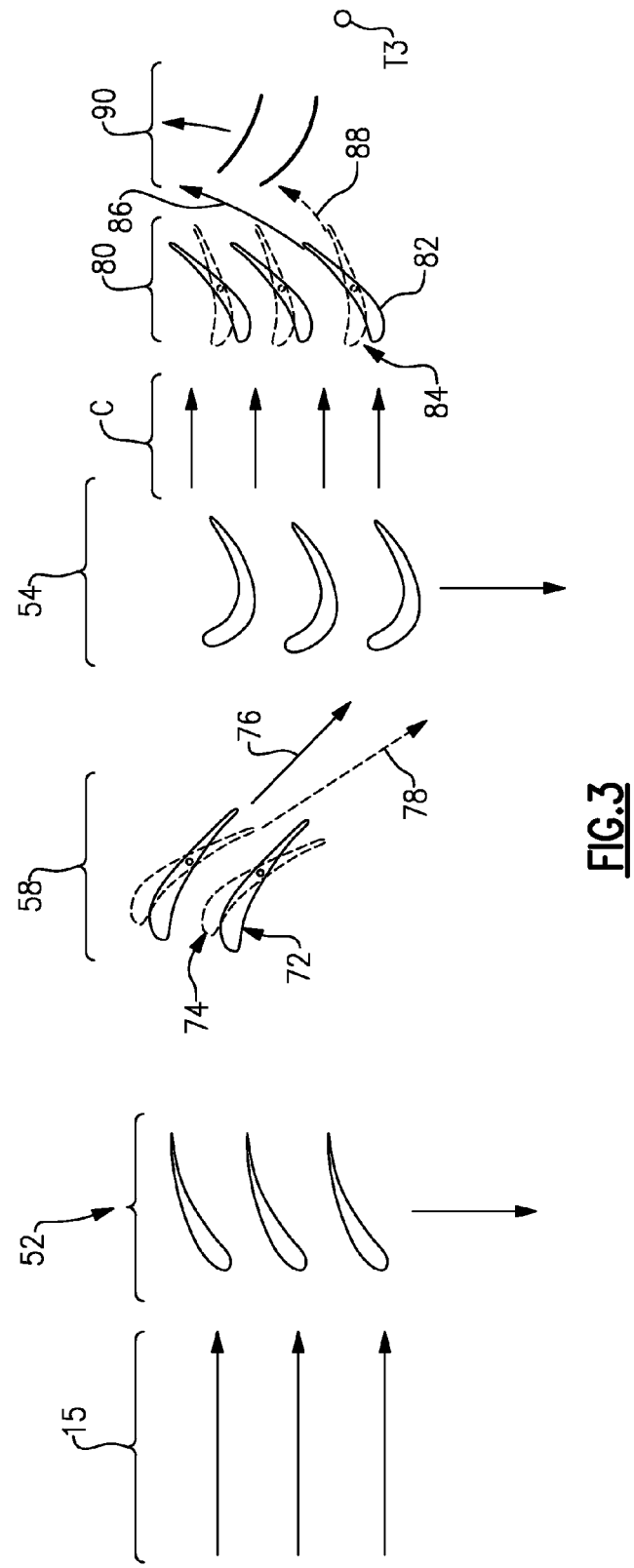
FIG. 3 is a schematic representation of a core gas flow path through the example gas turbine engine.

Referring to FIG. 3 with continued reference to FIG. 2, a first splitter 68 splits the incoming airflow 15 between the outer or second bypass passage 30 and the inner or first bypass passage 32. The second splitter 70 further splits the incoming airflow into the core stream flow C and the first bypass flow B1. The airflow 15 is compressed by the first fan section 12 that is driven by the low pressure turbine 24 through the inner shaft 25. A majority fraction of incoming airflow 15 is compressed further through the fan section 52 that is driven by the turbine 54. A minority fraction of the incoming airflow 15 bypasses fan section 52 as the outer bypass stream B2. Incoming airflow 15 that is compressed by the fan section 52 is split into the core stream flow C and the first bypass flow B1. Fan section 52 pumps core stream flow C to the variable vane 58. The variable vane 58 is movable between the first position generally indicated at 72 and the second position indicated at 74. Another embodiment holds fixed every other circumferential vane 58 and moves every other circumferential vane 58 as a pattern of fixed, variable, fixed, variable, . . . , fixed, variable. The fixed vanes 58 carry structural loads.

In the first position 72, airflow is directed to the turbine 54 in a first direction indicated by arrow 76. In the second position 74 of the variable vane 58 airflow will impact the turbine 54 in a direction indicated by arrow 78. The direction of impact of the flow determines the energy extracted from the core flow C by the turbine 54. Direction 78, also known as closing the variable vane 58, causes more energy extraction and direction 76, also known as opening the variable vane 58, extracts less energy via turbine 54. As appreciated, although first and second positions are shown by way of example, the variable vanes 58 may be moved through an infinite number of positions to provide the desired control over a speed of the turbine 54, and thereby control of the core airflow C.

The core airflow will flow through the turbine 54 and subsequently through a variable inlet guide vane 80 disposed just prior to the first compressor stage 90 of the high pressure compressor 26 (FIG. 2). The inlet guide vane 80 may also be variable to further direct airflow into the high pressure compressor section 26. In the first position 82, airflow is directed to the first compressor stage 90 in a first direction indicated by arrow 86. In the second position 84 of the inlet guide vane 80 airflow will impact the first compressor stage 90 in a direction indicated by arrow 88. As appreciated, although first and second positions are shown by way of example, the variable inlet guide vane 80 may be moved through an infinite number of positions to provide the desired control over the first compressor stage 90 of the high pressure compressor 26. A first position 72 of the variable vane 58 (open) and a first position 82 of the variable inlet guide vane 80 (closed) are controlled to minimize core airflow C and minimize the energy extracted from the core airflow C by the turbine 54 such that de-supercharging of the core airflow is minimized. A second position 74 (closed) of the variable vane 58 and a second position 84 (open) of the variable inlet guide vane 80 are controlled to maximize core airflow C and maximize the energy extracted from the core airflow C by the turbine 54 such that de-supercharging of the core airflow is maximized.

Accordingly, the example cold turbine or third spool turbine 54 operates at variable rotational speeds as is controlled by movement of the variable vane 58. At high flight Mach numbers the magnitude of the de-supercharging of the core airflow is maximized to control the temperature within the compressor 26. At low flight Mach numbers the amount of de-supercharging of the core airflow C is minimized to allow maximum operation of the compressor 26. The variable speed turbine 54 de-supercharges air that is proceeding into the core engine to minimize the impact of the temperature of the airflow 15 and prevent the high pressure compressor 26 from exceeding a maximum temperature. The variation of the core airflow C is independent of the bypass airflow B2 through the second bypass 30. At high flight Mach numbers, the amount of de-supercharging is maximized to provide the core airflow C at greater flow rates.

Accordingly, the example gas turbine engine includes a third turbine spool section 46 that includes a variable cold turbine 54 that drives a fan section 52. The energy of the flow entering fan section 52 is from the inlet airflow 15 itself, e.g., the ram energy due to the flight speed Mach number, and the compression by fan section 12 that is driven by turbine 24. Additional energy is imparted to the core flow C and the bypass airflow B1 by the fan section 52 that is driven by cold turbine 54. The flow and pressure energy into the cold turbine 54 is from the core fraction of the inlet airflow 15, the core fraction of fan section 12, and core fraction of fan section 52. The total energy of the core flow C entering turbine 54 is sufficient to drive fan section 52 entirely. Accordingly, the swirling and turning of the flow by turbine 54 is greater than the turning of the flow in fan section 52 in order to extract the energy needed to compress both core flow C and the bypass flow B1 via fan section 52 (FIG. 3).

At high flight Mach numbers and high engine thrust, controller 60 closes vane 58 and the cold turbine 54 extracts more energy from the core flow C to drive more energy into the bypass flow B1. At low flight Mach numbers and low engine thrust, control 60 opens vane 58 and the cold turbine 54 extracts less energy from the core flow C to drive less energy into the bypass flow B1. In coordination with the controller 60, the engine controller opens compressor inlet guide vane 80 to increase engine thrust and closes inlet guide vane 80 to decrease engine thrust. At high flight Mach numbers and high engine thrust, extracting more energy from the core flow C reduces the exit temperature T3 of compressor 26 and increases the thrust of the bypass flow B1. At low flight Mach numbers and low engine thrust, extracting less energy from the core flow C increases the exit temperature T3 of compressor 26 and improves the core thermodynamic cycle efficiency and reduces the thrust of the compression of the bypass flow B1 to improve propulsive efficiency.

Although a dual annular bypass flow gas turbine engine is indicated, the features of the disclosed invention could be utilized in an engine where only a single annular bypass flow B1 is utilized. Moreover, the example third spool cold turbine 54 could also be utilized in a gas turbine engine configuration including a single fan stage. As appreciated, in this example at least two fan stages are provided prior to the third spool 46 and the fan blade 52. Accordingly, the example third spool 46 and cold turbine 54 provide for the adaptation of a high performance gas turbine engine to various operational parameters while maintaining the compressor temperature within desirable temperature limits. The controller 60 and engine controller work in conjunction to control the various operational parameters while maintaining the compressor temperature within desirable temperature limits and maximizing the fuel efficiency of the engine.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A gas turbine engine comprising:
a first fan section including a plurality of fan blades rotatable about an axis;
a compressor in fluid communication with the first fan section;
a combustor in fluid communication with the compressor;
a first turbine section in fluid communication with the combustor, the first turbine section driving the first fan section and the compressor;
a core flow path directing airflow to the compressor;
a first bypass radially outward of the core flow path;
a first splitter fixed between the core flow path and the first bypass;
a second fan section disposed between the first fan section and the compressor directing airflow into the first bypass and the core flow path; and
a second turbine section disposed axially aft of a forward end of the first splitter within the core flow path between the second fan section and the compressor, the second turbine section coupled to the second fan section for driving the second fan section.

2. The gas turbine engine as recited in claim 1, including a variable vane disposed between the second fan section and the second turbine section for controlling airflow through the second turbine section.

3. The gas turbine engine as recited in claim 2, wherein the variable vane is movable between a first position for driving the second turbine at a first speed and a second position for driving the second turbine at a second speed slower than the first speed.

4. The gas turbine engine as recited in claim 2, including a fixed vane disposed between the second fan section and the variable vane.

5. The gas turbine engine as recited in claim 1, including a second bypass stream defined radially outward of the core flow path and the first bypass.

6. The gas turbine engine as recited in claim 5, wherein the second fan section directs airflow only into the first bypass and the core flow path.

7. The gas turbine engine as recited in claim 6, including a second splitter between the first bypass and the second bypass stream, with the second fan disposed axially aft of a forward most portion of the second splitter.

8. The gas turbine engine as recited in claim 1, wherein the second turbine and the second fan section are attached.

9. The gas turbine engine as recited in claim 1, including an augmenter aft of the first turbine section.

10. The gas turbine engine as recited in claim 1, wherein the second turbine is disposed only within the core flow path.

11. A gas turbine engine comprising:
a first fan section including a plurality of fan blades rotatable about an axis;
a core engine including a compressor in fluid communication with the first fan section, a combustor in fluid communication with the compressor and a first turbine section in fluid communication with the combustor, the turbine section driving the first fan section and the compressor;
a core flow passage providing air to the core engine;
an annular bypass passage disposed about the core engine;
a fixed splitter that includes a forward end that splits incoming airflow between the core flow passage and the annular bypass passage;
a second fan section disposed axially forward of the fixed splitter and between the first fan section and the compressor, the second fan section driving flow into the annular bypass passage; and
a second turbine section disposed within the core flow passage and axially aft of the forward end of the fixed splitter between the second fan section and the compressor, wherein the second turbine section is coupled to the second fan section.

12. The gas turbine engine as recited in claim 11, including a variable vane disposed between the second fan section and the second turbine section for controlling airflow through the second turbine section.

13. The gas turbine engine as recited in claim 12, wherein the variable vane is movable between a first position for driving the second turbine at a first speed and a second position for driving the second turbine at a second speed slower than the first speed.

14. The gas turbine engine as recited in claim 11, wherein the annular bypass passage comprises an inner annular bypass passage disposed about the core engine, an outer annular bypass passage radially outward of the inner bypass passage, and a splitter disposed between the inner and outer annular bypass passages.

15. The gas turbine engine as recited in claim 11, including an augmenter aft of the first turbine section.

16. The gas turbine engine as recited in claim 11, including at least one bearing assembly supporting rotation of the second fan section and the second turbine section.

17. A method of operating a gas turbine engine comprising defining a core gas flow path through a core engine, where the core engine includes a high pressure compressor, a combustor in communication with the compressor and a first turbine driven by gas flow generated by the combustor;
adjusting a vane disposed within the core gas flow path to a first position for driving a second turbine disposed forward of the high pressure compressor and only within in the core gas flow path to provide a first condition of core flow to the high pressure compressor; and
adjusting the vane to a second position for driving the second turbine to provide a second condition of core flow to the high pressure compressor.

18. The method as recited in claim 17, wherein the first condition comprises a first temperature of flow through the high pressure compressor and the second condition comprises a second temperature of flow through the high pressure compressor.

19. The method as recited in claim 18, including driving a fan blade forward of the core gas flow path with the second turbine for controlling flow into the gas flow path.

20. The method as recited in claim 17, including providing a maximum level of de-supercharging of flow into the core gas flow path at a first flight condition and providing a minimum level of de-supercharging of flow into the core gas flow path at a second flight condition.

* * * * *

UNITED STATES PATENT AND TRADEMARK OFFICE
CERTIFICATE OF CORRECTION

PATENT NO. : 9,157,366 B2
APPLICATION NO. : 13/483449
DATED : October 13, 2015
INVENTOR(S) : Daniel Bernard Kupratis Page 1 of 1

It is certified that error appears in the above-identified patent and that said Letters Patent is hereby corrected as shown below:

IN THE CLAIMS:

In claim 17, column 8, line 43; delete "in"

Signed and Sealed this
Eighth Day of March, 2016

Michelle K. Lee
*Director of the United States Patent and Trademark Office*